(12) United States Patent
Biel et al.

(10) Patent No.: US 8,651,774 B2
(45) Date of Patent: Feb. 18, 2014

(54) METHOD AND DEVICE FOR REMOVING A CONTACT LENS FROM A CONTAINER

(75) Inventors: Roger Biel, Aschaffenburg (DE); Carolin Hartert, Hösbach (DE)

(73) Assignee: Novartis AG, Basel (CH)

( * ) Notice: Subject to any disclaimer, the term of this patent is extended or adjusted under 35 U.S.C. 154(b) by 758 days.

(21) Appl. No.: 12/904,190

(22) Filed: Oct. 14, 2010

(65) Prior Publication Data

US 2011/0089054 A1 Apr. 21, 2011

Related U.S. Application Data

(60) Provisional application No. 61/252,476, filed on Oct. 16, 2009.

(51) Int. Cl.
*B65G 53/00* (2006.01)
(52) U.S. Cl.
USPC .............. 406/197; 406/92; 406/143; 206/5.1
(58) Field of Classification Search
USPC ...................... 406/92, 142, 143, 197; 206/5.1
See application file for complete search history.

(56) References Cited

U.S. PATENT DOCUMENTS

| | | | |
|---|---|---|---|
| 1,347,358 A | | 7/1920 | Adams |
| 4,445,362 A | * | 5/1984 | Wichterle ...................... 73/37.5 |
| 4,662,799 A | | 5/1987 | Paul |
| 5,127,517 A | * | 7/1992 | Clements et al. .............. 206/5.1 |
| 5,161,559 A | * | 11/1992 | Yoshihara et al. ............ 134/105 |
| 5,665,420 A | * | 9/1997 | Janssen et al. ................ 427/2.12 |
| 5,814,134 A | * | 9/1998 | Edwards et al. ..................... 96/6 |
| 5,824,276 A | * | 10/1998 | Janssen et al. ................ 422/292 |
| 6,030,632 A | * | 2/2000 | Sawan et al. .................. 424/405 |

(Continued)

FOREIGN PATENT DOCUMENTS

| | | |
|---|---|---|
| WO | 9842497 A2 | 10/1998 |
| WO | 2007042280 A1 | 4/2007 |

OTHER PUBLICATIONS

PCT International Search Report dated Jan. 26, 2011, International Application No. PCT/EP2010/065449, International Filing Date Oct. 14, 2010.

(Continued)

*Primary Examiner* — Joseph Dillon, Jr.
(74) *Attorney, Agent, or Firm* — Robert Ambrose

(57) ABSTRACT

There is described a method for the removal of a contact lens (30) from a container (10), with a contact lens (30) being immersed in a liquid (20) which is held in a container (10), and the contact lens (30) being removed from the container (10) together with at least a portion of the liquid (20) through a removal tube (3) which is dipped into the liquid (20) within the container (10). First the container (10) containing the liquid (20) and the immersed contact lens (30) is closed pressure-tight with a lid (2), which comprises the removal tube (3) and a pressure tube (5). Both, the removal tube (3) and the pressure tube (5), are guided through the lid (2). After the closing of the container (10) with the lid (2) an overpressure is applied to the interior of the closed container (10) through the pressure tube (5). The overpressure is applied such that the contact lens (30) and the liquid (20) are pressed into the removal tube (3) and removed together therethrough. There is also described a device (1) for carrying out the method.

9 Claims, 2 Drawing Sheets

(56) References Cited

U.S. PATENT DOCUMENTS

| | | | |
|---|---|---|---|
| RE37,432 E * | 11/2001 | Martin et al. | 53/54 |
| 6,326,054 B1 * | 12/2001 | Smith et al. | 427/168 |
| 6,355,124 B1 * | 3/2002 | Blomberg et al. | 156/99 |
| 6,461,325 B1 * | 10/2002 | Delmotte et al. | 604/82 |
| 7,423,747 B2 | 9/2008 | Biel | |
| 7,637,679 B2 * | 12/2009 | May et al. | 401/133 |
| 7,678,089 B2 * | 3/2010 | Py et al. | 604/302 |
| 7,756,559 B2 * | 7/2010 | Abreu | 600/318 |
| 2004/0222539 A1 | 11/2004 | Hagmann | |
| 2005/0186128 A1 * | 8/2005 | Pinchassi Dar et al. | 422/300 |
| 2006/0053505 A1 * | 3/2006 | Bryan | 800/20 |
| 2006/0113318 A1 * | 6/2006 | May et al. | 222/94 |
| 2006/0202369 A1 * | 9/2006 | Foreman et al. | 264/1.32 |
| 2007/0045562 A1 * | 3/2007 | Parekh | 250/455.11 |
| 2007/0059198 A1 * | 3/2007 | Prestwood et al. | 422/24 |
| 2007/0146698 A1 | 6/2007 | Biel | |
| 2007/0194486 A1 * | 8/2007 | Sanders et al. | 264/232 |
| 2007/0218298 A1 * | 9/2007 | Terry | 428/447 |
| 2007/0253761 A1 * | 11/2007 | May | 401/133 |
| 2007/0296097 A1 | 12/2007 | Biel | |
| 2008/0121153 A1 * | 5/2008 | Eastin et al. | 111/118 |
| 2009/0152267 A1 * | 6/2009 | May et al. | 220/23.83 |
| 2010/0006455 A1 * | 1/2010 | Whyte | 206/5.1 |
| 2011/0193270 A1 * | 8/2011 | Tan | 264/504 |
| 2012/0132667 A1 * | 5/2012 | May | 222/1 |

OTHER PUBLICATIONS

PCT Written Opinion of the International Searching Authority dated Jan. 26, 2011, International Application No. PCT/EP2010/065449, International Filing Date Oct. 14, 2010.

* cited by examiner

METHOD AND DEVICE FOR REMOVING A CONTACT LENS FROM A CONTAINER

This application claims the benefit under 35 U.S.C. §119 (e) of U.S. provisional application Ser. No. 61/252,476, filed on Oct. 16, 2009, incorporated herein by reference in its entirety.

FIELD

The invention relates to a method for removing a contact lens from a container with the contact lens being immersed in a liquid which is held in the container, the contact lens being removed from the container together with at least a portion of the liquid through a removal tube which is dipped into the liquid within the container. The invention also relates to a device used for the removing of a contact lens from a container.

BACKGROUND

It is well established in the art to produce hard and soft contact lenses in an automated production process with reusable moulds. In mass production of contact lenses, specifically so-called disposable lenses, a large number of contact lenses must be manufactured in a relatively short period of time. In an advantageous method of mass production, a starting material, e.g., a prepolymer solution containing water, is introduced into a female mould half, the casting mould is closed by the respective male mould half and then the starting material is polymerized and/or crosslinked with ultraviolet (UV) light. The mould halves mask the UV light in the respective areas which are outside of the areas required for contact lens production. Such cyclic mass production of contact lenses is described, e.g., in WO 98/42497. Suitable polymers formed by photochemical polymerization of suitable prepolymers include polymers based on polyvinyl alcohols (PVA) or silicone hydrogels (SiHy) as well as based on polyethylene glycols (PEG).

Besides casting and polymerization and/or crosslinking of the contact lenses the production process comprises a treatment of the contact lenses in a number of further treatment stations, such as, e.g., a coating station, a cleaning station, or an inspection station. To ensure the quality of the contact lenses in an automated production process, the finished contact lenses must be optically inspected. However, contact lenses, in particular soft contact lenses, are difficult to handle using mechanical means. Therefore, in the inspection station, for example, the contact lenses are individually inserted into water filled cuvettes for the purpose of optical testing. Such a cuvette for optical testing of contact lenses is known, e.g., from WO 2007/042280. Removal of a contact lenses from such a water filled cuvette, hither-to is accomplished by introducing a suction tube into the cuvette. Due to an underpressure applied through the suction tube the contact lens is removed from the cuvette together at least with some of the water contained therein. The problem with this technology lies in the fact that it requires a considerable technical effort for the removal of the contact lens and the water from the vacuum system. For that purpose special vacuum separators are required which are complicated, costly and require specific maintenance. The application of vacuum also is limited to a theoretical maximum pressure difference of about 1 bar. Practically, the achievable maximum pressure difference lies in the range of about 0.5 bar only. This small pressure difference may result in a suction power which is too little, such that not every contact lens is removed from its respective cuvette.

It is therefore an object of the present invention to provide a method and a device for the removal of contact lenses from containers, such as, e.g., inspection cuvettes, which overcomes the above-mentioned drawbacks. A method and a device shall be provided which ensures the removal of contact lenses from the containers. Complicated and costly vacuum separators shall be avoided.

SUMMARY

These and still further objects are met by a method for removing contact lenses from containers which comprises the method steps listed in claim 1. The objects are also met by a respective device for removing contact lenses from containers which comprises the features listed in the respective independent device claim. Further improvements of the invention and preferred embodiments are subject of the respective dependent claims.

The invention provides a method for the removal of contact lenses from containers, with a contact lens being immersed in a liquid which is held in a container, and the contact lens being removed from the container together with at least a portion of the liquid through a removal tube which is dipped into the liquid within the container. First the container containing the liquid and the immersed contact lens is closed pressure-tight with a lid, which comprises the removal tube and a pressure tube. Both, the removal tube and the pressure tube, are guided through the lid. After the closing of the container with the lid an overpressure is applied to the interior of the closed container through the pressure tube. The overpressure is applied such that the contact lens and the liquid are pressed into the removal tube and removed together therethrough. More particularly, the method includes the steps of providing a contact lens immersed in a liquid in a container, providing a removal tube and dipping the removal tube into the liquid in the container, providing a pressure tube closing the container containing the liquid and the immersed contact lens pressure-tight with a lid comprising the removal tube and the pressure tube which both are guided through the lid and applying an overpressure to the interior of the closed container through the pressure tube such that the contact lens and the liquid are pressed into the removal tube and the contact lens is removed from the container together with at least a portion of the liquid through a removal tube.

In accordance with the invention an overpressure is applied for the removal of a contact lens from the container, instead of the application of a vacuum. Due to the overpressure the contact lens together with the liquid contained in the container are removed through the removal tube. The contact lens may then simply be separated from the liquid by passing the liquid through a sieve or the like. Thereafter the contact lens may be removed from the sieve. The novel method does not require a vacuum for the removal of the contact lens from the container. Consequently, complicated and costly vacuum separators are avoided. The application of an overpressure instead of a vacuum also overcomes the limitation of the maximum possible pressure difference. Theoretically any pressure difference to ambient pressure may be adjusted. Practically the achievable maximum pressure difference is only limited by the burst strength of the container and the pressure-tight attachment of the lid thereto. Thus, the overpressure inside the container may be adjusted to a magnitude which ascertains that every contact lens is removed from its respective container.

The removal tube is dipped into the liquid while the pressure tube may terminate above the liquid level in the container. It proves advantageous for the capture of the contact lens if the removal tube is arranged such that its front end is located about 1 mm to about 5 mm above the bottom of the container.

Depending on the kind of liquid in the container, the sizes of the contact lenses and the configuration of the removal tube it is found that an overpressure applied to the interior of the container through the pressure tube of about 0.5 bar to about 5 bar above ambient pressure is sufficient for definitely removing the lenses from their respective containers.

The gas for establishing the overpressure in the container may be any kind of non-reactive gas and compatible with the liquid and the lens in the container. For convenience, relative inertness and availability reasons usually pressurized air will be applied.

By arranging an exit opening of the removal tube at a level which is lower than that of the bottom of the cuvette comparably small overpressures in the magnitude of about 1 bar are sufficient for the removal of the contact lenses from their respective containers.

There is no need to maintain the overpressure in the container for a very long time. In a variant of the invention the overpressure may be applied impulse-like with a duration of from about 0.75 seconds to about 2 seconds. In combination with the exit opening of the removal tube being arranged lower than the bottom of the container e.g. a pressure pulse of the magnitude of 1 bar applied over less than 1 seconds proves to be sufficient to remove a contact lens from its container.

In order to facilitate the entry of the contact lens into the removal tube in another variant of the invention removal tube at its front end is provided with a funnel having a diameter of about 4 mm to about 9 mm.

The removal tube itself is selected to have an internal diameter of about 2 mm to about 6 mm to support the rolling up of the contact lens to a cigar-like shape and thus to facilitate the transport of the contact lens together with the liquid through the tube.

The invention may be used for the removal of contact lenses from any kind of container having a closed bottom and capable of being closed pressure tight. The invention proves particularly useful for the removal of a contact lens from a cuvette for optical inspection of contact lenses.

The invention may also be used for cleaning purposes of a container. Then, after the pressure tight closing of the container with the lid first a cleaning liquid, such as, e.g., water, may be introduced into the container through the pressure tube. The cleaning liquid may then be removed from the container by applying an overpressure to the interior of the closed container through the pressure tube, resulting in an emptying of the container through the removal tube.

A device for carrying out the method for the removal of contact lenses from containers comprises a lid which is adapted for closing a container pressure-tight. A removal tube which is adapted for being dipped into a liquid, which is held in the container and in which a contact lens is immersed, and for receiving the contact lens together with at least a portion of the liquid, is held by and guided through the lid. The device further comprises a pressure tube which is held by and guided through the lid and is adapted for being connected to a source of overpressure.

The device according to the invention is simple in construction and may easily be installed and integrated in existing automated production lines for the manufacture of contact lenses, without the requirement of major modifications to the production line or the containers involved. The device allows the application of an overpressure for the removal of a contact lens from a container instead of a vacuum. Thus, complicated and costly vacuum separators may be avoided. The device is adapted for creating an overpressure inside the container such, that it is ensured that the contact lens is removed through the removal tube.

The removal tube protrudes longer from the inside of the lid than the pressure tube, such that with the lid mounted pressure-tight on the container a front end of the removal tube is located about 1 mm to about 5 mm above the bottom of the container. This construction facilitates the entry of the contact lens into the removal tube.

In an exemplary embodiment of the device the removal tube at its front end is provided with a funnel having a diameter of about 4 mm to about 9 mm. The funnel and its dimensions further assist the entry of the contact lens into the removal tube.

The removal tube is selected to have an internal diameter of about 2 mm to about 6 mm. These diameters assist the rolling up of the contact lens in a cigar-like manner, which facilitates the transport of the contact lens through the removal tube.

In order to ascertain that a contact lens is removed from the container, the lid is adapted to maintain an overpressure within the container which amounts to about 0.5 bar to about 5 bar above ambient pressure.

Production sites for contact lenses usually are provided with a central source for compressed air. Thus, it proves advantageous if the pressure tube is adapted and provided with the respective connectors to be connected to that source of pressurized air.

The device in accordance with the various embodiments thereof may be used for the removal of contact lenses from any kind of container having a closed bottom and capable of having an overpressure created in its inside. A particular application of the device according to the invention is the removal of contact lenses from cuvettes for optical inspection of the lenses.

These and still further features and advantages of the invention will become apparent from the following description of an exemplary embodiment of the device for removing contact lenses from containers, reference being made to the schematic drawings, which are not to scale, in which:

DETAILED DESCRIPTION

The following description of an exemplary embodiment of the invention is for illustrative purposes only and is not intended for limitation of the scope of the invention.

Figure 1:
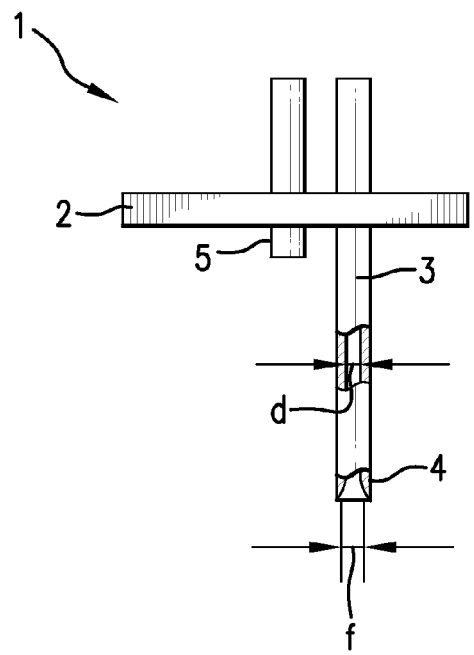
FIG. 1 is device according to the invention which is to be attached to a container for
  i. removing a contact lens therefrom.

FIG. 1 shows a device used for the removal of a contact lens from a container, such as, e.g., an inspection cuvette for the optical inspection of a contact lens during contact lens manufacture. The device, which is generally designated with reference numeral 1 comprises a plate-like lid 2, which is adapted for closing a container, such as, e.g. an inspection cuvette, pressure-tight. The lid 2 has an upper and a lower face, the lower face in use being directed towards the interior of the container. In order to achieve a pressure tight sealing of the lid, its lower face may be provided along a circumference which corresponds to the shape of the rim surrounding the opening of the container with a sealing means. Alternatively, the lower face of the lid 2 may be entirely covered with a sealing material, such as, e.g., a layer of rubber or the like. Two tubes 3, 5 are guided through the plate-like lid 2; the penetration bores in the lid 2 for the two tubes 3, 5 being sealed pressure tight. One of the tubes 3, i.e., the removal tube, extends a longer distance from the lower face of the lid 2 than does the second tube 5, i.e., the pressure tube. The length of the tube extending from the lower face of the lid 2 is selected such, that, with the lid 2 mounted and closing a container pressure-tight, a front end of the removal tube 3 is located about 1 mm to about 5 mm above the bottom of the container. The longer tube 3 is a removal tube for removing a contact lens together with the liquid in which the contact lens is immersed. Its front end may be provided with a funnel 4 which has a diameter f of about 4 mm to about 9 mm. The removal tube 3 has an internal diameter d which amounts to about 2 mm to about 6 mm. The rear end of the removal tube 3 which extends from the upper face of the lid 2, is adapted to be connected to a tube system for guiding the contact lens and the liquid to a receptacle. The second tube 5 is a pressure tube. Its rear end which extends from the upper face of the lid 2, is adapted to be connected to a pressure source, such as, e.g., a source of compressed air.

In FIGS. 2-5 the device according to FIG. 1 is shown in combination with a container, in which a contact lens is immersed in a liquid in order to illustrate the method to remove a contact lens from that container. The container is e.g. a cuvette for optical inspection of contact lenses during the manufacture process and is generally designated with reference numeral 10. It is to be noted that the container may be any other kind of container in which a contact lens is temporarily immersed in a liquid from which it is desired to be removed, for example, for continuation of a production process.

Figure 2:
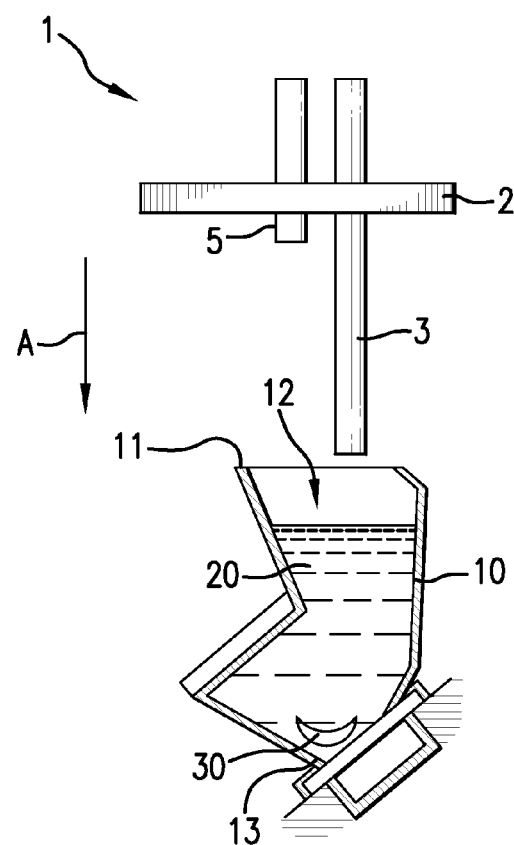
FIGS. 2-5 are sectional side views of the device in combination with a container,
  i. such as, e.g. a cuvette for contact lens inspection, from which the contact lens
  ii. is to be removed.

FIG. 2 shows the device 1 comprising the lid 2 with the removal tube 3 and the pressure tube 5 in the process of being lowered onto the rim 11 surrounding the opening 12 of the cuvette 10. This is indicated in FIG. 2 by the arrow A. The cuvette 10 is filled with a liquid 20, which for example may be water. A contact lens 30 is shown immersed in the liquid 20 and lying at the bottom 13 of the cuvette 10.

Figure 3:
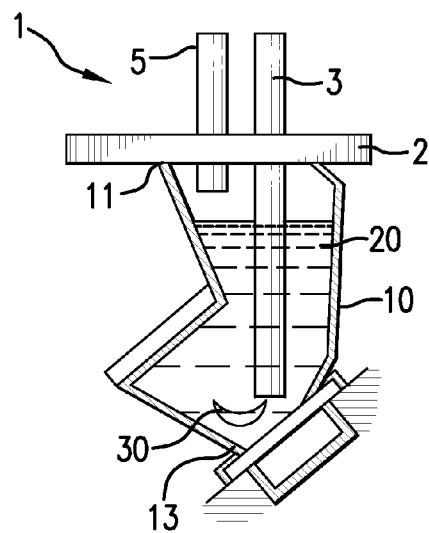

FIG. 3 shows the device 1 completely lowered to the rim 11 of the cuvette 10. The rim 11 presses against the sealing means on the lower face of the lid 2. Thereby the cuvette 10 is closed pressure-tight. In this stage the front end of the removal tube 3 dips into the liquid 20 and is located about 1 mm to about 5 mm above a bottom 13 of the cuvette 10. The pressure tube 5 is still located above the filling level of the liquid 20.

Figure 4:
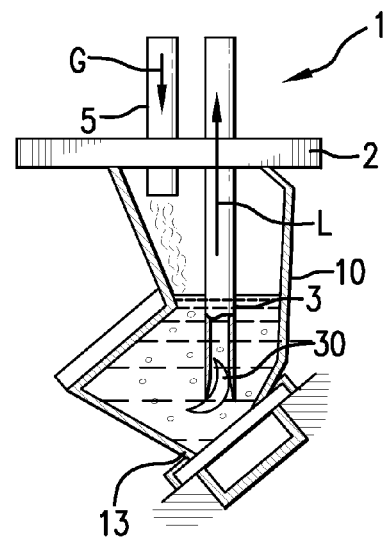

FIG. 4 indicates the emptying of the cuvette and the removal of the contact lens 30. For that purpose an overpressure is applied to the interior of the cuvette 10. This is achieved by introducing a gas, which is generally inert and compatible with the liquid in the cuvette, with pressure through the pressure tube 5 into the closed cuvette 10. The flow of gas, usually compressed air, is indicated by the arrow G in the pressure tube 5. The overpressure inside the closed cuvette 10 is selected to amount to about 0.5 bar to about 5 bar above ambient pressure. Due to the overpressure the liquid 20 is pressed out of the cuvette 10 through the removal tube 3 which is indicated in FIG. 4 by the arrow L and by the lowering liquid level inside the cuvette 10. Eventually the contact lens 30 will enter into the removal tube 3 and will be transported out of the cuvette 10 together with the liquid 20.

In an embodiment of the invention the exit opening of a tube system (not shown) which is attached to the removal tube 3 is arranged lower than the bottom 13 of the cuvette 10. By arranging the exit opening of the removal tube system at a lower level than that of the bottom 13 of the cuvette 10 comparably small overpressures in the magnitude of about 1 bar are sufficient for the removal of the contact lens 30 from the cuvette 10. There is no need to maintain the overpressure in the cuvette 10 for a very long time. In a variant of the invention the overpressure may be applied impulse-like with a duration of from about 0.75 seconds to about 2 seconds. In combination with the exit opening of the removal tube system being arranged lower than the bottom 13 of the cuvette 10 e.g. a pressure pulse of the magnitude of 1 bar applied over less than 1 seconds proves to be sufficient to remove a contact lens 30 from the cuvette 10. The contact lens 30 may then be separated from the liquid 20 simply by passing the liquid through a sieve or like element. The liquid 20 flows through the sieve and may be reused; the contact lens 30 remains on the surface of the sieve and may be removed therefrom.

Figure 5:
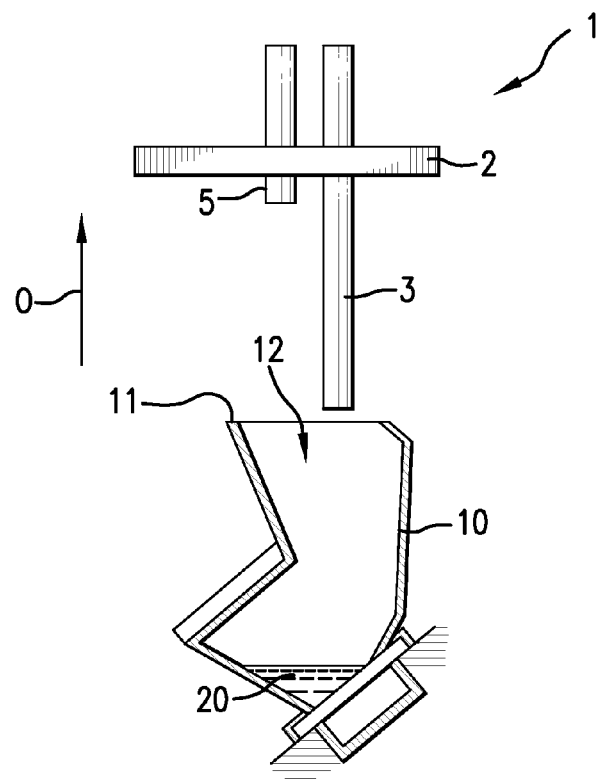

Finally FIG. 5 shows the device 1 with the plate-like lid 2 and the removal tube 3 and the pressure tube 5 being lifted from the rim 11 of the cuvette 10 exposing the opening 12 of the cuvette 10 again. This is indicated by arrow O. The contact lens has been removed. There might remain a small amount of liquid 20 inside the cuvette 10, which can if needed be emptied prior to cleaning of the cuvette 10.

In accordance with the invention an overpressure is applied for the removal of a contact lens from a container, e.g. from a cuvette for lens inspection, instead of a vacuum. Due to the overpressure the contact lens together with the liquid contained in the container are removed through the removal tube. The contact lens may then simply be separated from the liquid by passing the liquid through a sieve or the like. Thereafter the contact lens may be removed from the sieve. The novel method does not require a vacuum for the removal of the contact lens from the container. Consequently, complicated and costly vacuum separators are avoided. The application of an overpressure instead of a vacuum also overcomes the limitation of the maximum possible pressure difference. Theoretically any pressure difference to ambient pressure may be adjusted. Practically the achievable maximum pressure difference is only limited by the burst strength of the container and the pressure-tight attachment of the lid thereto. Thus, the overpressure inside the container may be adjusted to a magnitude which ascertains that every contact lens is removed from its respective container. The invention has been explained with reference to the manufacture of contact lenses. It is to be noted, that the invention also encompasses the manufacture of other types of ophthalmic lenses, such as, e.g., intraocular lenses etc. Thus, the term contact lens must not be read as limiting, but it also includes these other types of ophthalmic lenses which may be manufactured in automated manufacture processes.

The invention claimed is:

1. A method for the removal of a contact lens from a container, comprising the steps of providing a contact lens immersed in a liquid in a container, providing a removal tube and dipping the removal tube into the liquid in the container, providing a pressure tube, closing the container containing the liquid and the immersed contact lens pressure-tight with a lid comprising the removal tube and the pressure tube which both are guided through the lid, and applying an overpressure to the interior of the closed container through the pressure tube, such that the contact lens and the liquid are pressed into the removal tube and the contact lens is removed from the container together with at least a portion of the liquid through a removal tube.

2. The method according to claim 1, wherein the removal tube is dipped into the liquid until its front end is located about 1 mm to about 5 mm above a bottom of the container.

3. The method according to claim 1, wherein the overpressure which is applied to the interior of the container through the pressure tube is adjusted to about 0.5 bar to about 5 bar above ambient pressure.

4. The method according to claim 1, wherein the overpressure is established by injecting pressurized air.

5. The method according to claim 1, wherein an exit opening of a removal tube system is arranged at a level which is lower than that of the bottom of the container.

6. The method according to claim 5, wherein the overpressure is applied impulse-like with a duration of from about 0.75 seconds to about 2 seconds.

7. The method according to claim 1, wherein the removal tube at its front end is provided with a funnel having a diameter of about 4 mm to about 9 mm.

8. The method according to claim 1, wherein a removal tube is selected which has an internal diameter of about 2 mm to about 6 mm.

9. Use of the method according to claim 1 for the removal of a contact lens from a cuvette for optical inspection of contact lenses.

* * * * *